April 15, 1952 — J. W. GREEN — 2,593,296
BEEHIVE WITH VENTILATING ENDS
Filed Feb. 11, 1946
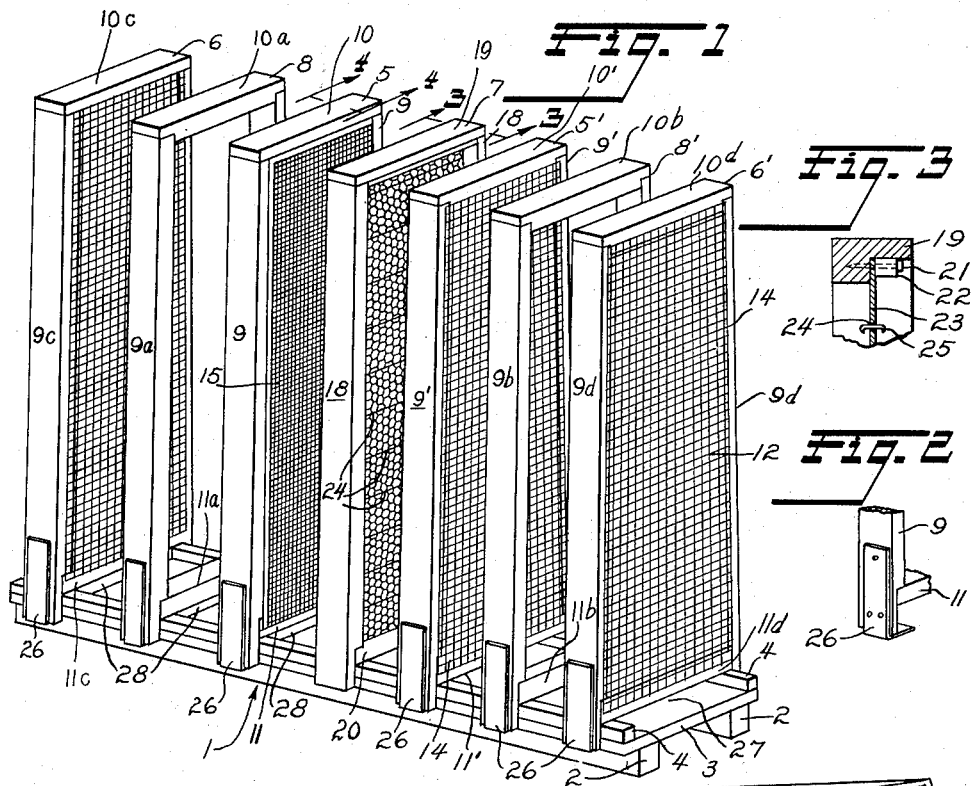
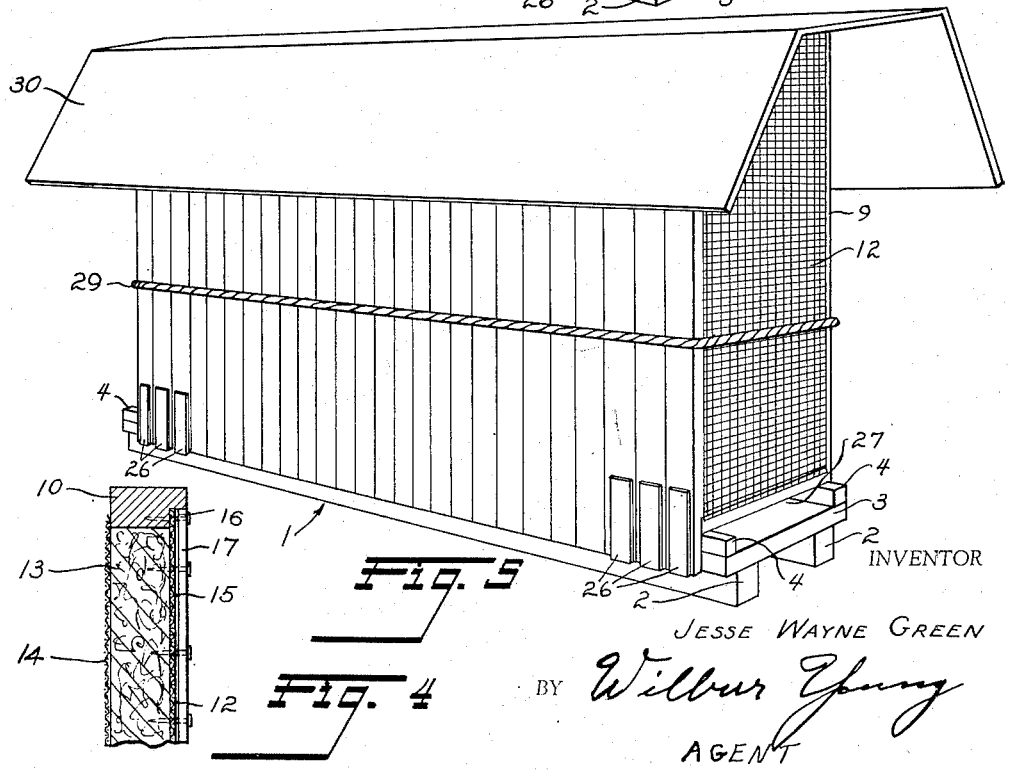
INVENTOR
JESSE WAYNE GREEN
BY Wilbur Young
AGENT Patented Apr. 15, 1952

2,593,296

UNITED STATES PATENT OFFICE 2,593,296

BEEHIVE WITH VENTILATING ENDS

Jesse Wayne Green, Phoenix, Ariz., assignor of one-half to Floyd Reynolds Wigely, Phoenix, Ariz.

Application February 11, 1946, Serial No. 646,829

5 Claims. (Cl. 6—2)

This invention relates to improvements in beehives more particularly to a beehive constructed to provide adequate and efficient ventilation, and to protect the bees from extremes of temperature and from sudden changes in temperature.

It has long been the aim of those engaged in bee keeping to develop a hive in which the temperature and oxygen content may be controlled. These factors are especially important in areas where sudden changes in temperature occur. For instance, in the southwestern part of the United States the days are quite hot and the nights often quite cold. It it a well known fact that bees generate considerable heat within the hive and consequently the temperature rises within said hive. If this occurs on a hot day, the heat within the hive becomes excessive and results in the death of the bees, due to the heat and poor ventilation. If the hive is constructed in such a manner as to keep the temperature moderate within the hive on a hot day, it is very difficult to keep the hive sufficiently warm on a cold night with the same construction. In spite of the fact that the bees generate considerable heat, they do not generate enough to keep warm on cold nights and consequently they tend to die of cold. In areas where cold nights and hot days occur, it is now the practice to tend the hives both morning and night, in order that the extremes of temperature between day and night be provided for. In parts of the country other than those having the conditions mentioned above, the problem arises between conditions of summer and winter. If the hive is constructed for summer it must be protected in some manner for winter conditions.

The principal object of the present invention is to provide a hive so constructed as to protect the bees against extremes of temperature, especially where the days are hot and the nights are cold, without the necessity of tending the hive for day and night conditions, and at the same time to provide adequate ventilation of the hive.

Another object of the invention is to provide a hive in which the comb frames are easily accessible and may be removed without disturbing the bees in the unfinished frames.

Another object is to provide a hive with ventilating end frames which may be used in any area, which ventilating frames may be added or removed, in accordance with climatic conditions of the area.

Another object is to provide a hive which may readily be enlarged or reduced in size, in accordance with the requirements of large or small colonies.

The above and other objects and advantages of my invention will be further described in connection with accompanying drawings and more detailed description, wherein the features of novelty which characterize my invention are pointed out, and set forth in the claims annexed to and forming a part of this specification.

In these drawings,

Fig. 1 is a perspective view of the interior construction of a bee hive embodying my invention showing several frames in expanded relation;

Fig. 2 is an enlarged fragmentary sectional view of the ventilating frame showing means for slidably attaching the frame to the base;

Fig. 3 is an enlarged fragmentary section taken on the line 3—3 of Fig. 1.

Fig. 4 is an enlarged fragmentary section taken on the line 4—4 of Fig. 1.

Fig. 5 is a perspective view of the hive in its assembled condition.

Referring now to Fig. 1, the improved bee hive embodying the invention includes a base 1 having cleats 2 for spacing it from the ground; secured across the tops of the cleats are floor boards 3 forming the floor of the hive. Secured to the edge of the boards 3 are supporting rails 4 upon which the hive elements rest. Vertically disposed in side by side relation on the base are front and rear inner ventilating end frames 5 and 5' and front and rear outer ventilating end frames 6 and 6', one or more comb frames 7 and front and rear spacer frames 8 and 8'. The inner ventilating end frames 5 and 5' consist of side members 9 and 9' respectively, top members 10 and 10' respectively and bottom members 11 and 11' respectively. Similarly the rear outer ventilating end frames 6 and 6' consist of side members 9c and 9d respectively, top members 10c and 10d respectively, and bottom members 11c and 11d respectively. The side members, top members and bottom members of each of the inner ventilating end frames 5 and 5' and front and rear ventilating end frames 6 and 6' define a space 12 in each frame which is filled with an air pervious insulating material 13 such as excelsior, spun glass, rock or glass wool or other suitable air pervious material. The spacer frames 8 and 8' do not contain any insulating material but are of a similar general construction as the end frames 5, 5' and 6, 6' in that frames 8 and 8' both have side members 9a and 9b respectively, top members 10a and 10b respectively, and bottom members 11a and 11b respectively. This air pervious material 13 is retained within the confines of frame elements forming the end frames 5 and 5' and 6 and 6' by wire screening 14 or other mesh material which is fine enough to prevent the bees from entering the ventilating frame through the mesh 14. The side of the ventilating frame which is positioned next to the comb frame 7 is provided with a very fine mesh material 15, Fig. 4. In addition, the ventilating frame is rabbeted as at 16 on the inside of the top, and sides to accommodate the mesh material 15. The recessing of the fine mesh material 15 in the rabbeting 16 and the bottom bar 11 which is assembled flush with the non-rabbeted side of the ventilating frame, provides a bee space between the ventilating frames 5 and 5' and the honey comb frame 7.

The fine mesh material 15 is used on the side of the ventilating frames 5 and 5' next to the honey comb frame 7 to prevent the protrusion of the insulating material 13. The mesh material is held in the rabbeting 16 by means of molding 17 which is flush with the surface of the side bars 9 and 9' and top bars 10 and 10', thereby preventing an undesirable recess where the surfaces of the ventilating frames 5 and 5' and honeycomb frame 7 meet when the hive is assembled. The outer ventilating frame members 6 and 6' are constructed in the same manner as the inner ventilating frames 5 and 5', except that the bottom bars 11c and 11d are the same width as the side bars 9c and 9d and top bars 10c and 10d. The reason for this is so that all of the surfaces of the inner and outer frames will be flush when they are together thus preventing the bees from entering the spaces between them. The spacer frames 8 and 8' with their side bars 9a and 9b, top bars 10a and 10b and bottom bars 11a and 11b are placed between the inner and outer ventilating frames 5 and 5' and 6 and 6' for a purpose that will be described later.

The honeycomb frame 7 consists of side elements 18, top element 19 and bottom element 20. Each of the top members 19 in the comb frame 7 is rabbeted as at 21, for the reception of a strip molding 22 which secures the comb foundation 23. The comb foundation is further held in place by a plurality of spaced horizontal wires 24. These horizontal wires 24 extend between and are secured to the sides 18 of the frame 7 by means of staples 25.

Each of the bottom elements in the inner and outer ventilating end frames, comb frames, and spacer frames is spaced a distance from the bottom of the side members to provide legs for engaging the base to support the frames thereon. The ventilating frames 5 and 5' and 6 and 6' and the spacer frames 8 and 8' are provided with L-shaped metal clips 26, Fig. 2, so that they may slide over the end of the base 1 and snugly grip the under surface of the floor, as shown in Fig. 1. By attaching these frames to the base in this manner it makes the frames 5 and 5', 6 and 6', and 8 and 8' self-supporting when slid along the base away from the comb frames 7. By attaching the frames 5 and 5', 6 and 6', and 8 and 8' in this manner it is only necessary to slide them out of the way when the bee keeper is working the hive.

Entrance into the hive is provided by the space 27 between the floor and the bottom frame members of the ventilating end frames and the comb frames. This space results from the fact that the bottom bars of the various frames rest on the rails 4. If it is desired to have only one entrance to the hive, it is only necessary to secure strips 28 of the necessary width to the bottom elements of one set of ventilating end frames 5 and 5' and 6 and 6' and to the spacer elements 8 and 8'.

In assembling the hive for areas where there are extreme temperature changes, the comb frames 7 are placed on the base 1 and the ventilating end frames 5 and 5' are slid along the base until they meet the comb frames; then the spacer frames 8 and 8' are slid along the base until they engage the inner ventilating frame; finally the outer ventilating end frames 6 and 6' are slid onto the base, thus completing the hive. The frames are then secured together by encircling the unit with a rope or cable 29 as shown in Fig. 5 or any other suitable means such as, for example, metal clips. Of course, it may not be necessary to use the spacer frames and outer ventilating end frames; however, this depends on the climatic conditions of the area where the hive is to be used.

After the hive has been assembled, a thatched or woven cover 30, Fig. 5, or a mat of similar material is thrown over the top for protection from rain and snow. This mat must possess the characteristics of being able to shed water and to be pliant enough to fit snugly around the hive.

The function of the ventilating end frames is as follows: When the inner ventilating frames 5 and 5', outer ventilating frames 6 and 6' and spacer frames 8 and 8' are used, the air tends to percolate through the air pervious material of the outer frame into the air mass which is within the confines of the spacer members 8 and 8'. This confined air mass tends to temper the air passing through the outer ventilating end frame before it passes into and through the inner ventilating end frames and thence into the hive. On a cold night, the air mass confined in the spacer would warm the incoming cold air due to the fact this air mass would be somewhat warmer, thus keeping the temperature in the hive more uniform and at the same time supplying fresh air thereto. On a hot day, the air confined within the frames in the hive would be cooler than the incoming air, thus cooling it before it reaches the bees, consequently keeping the hive cool, and at the same time there would be an adequate supply of fresh air. Thus constant attendance of the hives is eliminated and it is merely necessary to check the hives only a few times a week rather than every morning and evening. It also allows one man to attend several hundred colonies instead of just twenty-five or thirty, as is now the case. In the early spring it may be advisable to admit a large volume of warm air into the hive so as to tempt the bees to fly out and so keep the hive clean and so reduce the chances of disease resulting from too long confinement.

Although I have shown and described a particular embodiment of my invention, it will be apparent that modification and changes may be made without departing from the spirit and scope of the invention as pointed out in the following claims.

I claim as my invention:

1. A beehive comprising a comb frame, a first set of insulation-carrying frames filled with fibrous, air pervious material and positioned on opposite sides of the comb frame, a set of spacer frames positioned on the outer sides of said insulation-carrying frames, a second set of insulation-carrying frames filled with fibrous, air pervious material and positioned on the outside of said spacer frames, whereby incoming hot or cold air passes first through the second set of insulation frames and then mixes with and is tempered by the air in the spacer frames, and then passes through the air pervious material in the first set of frames into the comb frame.

2. The combination as claimed in claim 1, wherein all said frames have their bottom edges spaced above the floor of the hive to define registering openings cooperating to form a continuous passageway for the entry and exit of the bees.

3. A beehive in accordance with claim 1 wherein the second set of insulation-carrying frames are each provided with mesh-like material to retain the fibrous air-pervious material within said frames.

4. A beehive in accordance with claim 1 which includes a base for supporting the beehive, said base comprising cleats, a floor secured to the top surface of said cleats, and rails secured to and adjacent the side edges of said floor whereby the bottom edges of each of the frames are supported by said rails and provide an entrance to the hive for the bees.

5. A beehive in accordance with claim 4 wherein the bottom of each side edge of each of the frames are provided with leg-like extensions which engage the side edges of said base.

JESSE WAYNE GREEN.

REFERENCES CITED

The following references are of record in the file of this patent:

UNITED STATES PATENTS

| Number | Name | Date |
| --- | --- | --- |
| 31,890 | Ide | Apr. 2, 1861 |
| 33,499 | Smith | Oct. 15, 1861 |
| 47,169 | Henschen | Apr. 4, 1865 |
| 74,618 | Singleton | Feb. 18, 1868 |
| 85,716 | Wright | Jan. 5, 1869 |
| 117,539 | Henry | Aug. 1, 1871 |
| 140,497 | Grover | July 1, 1873 |
| 142,318 | Wright | Aug. 26, 1873 |
| 318,638 | Martin | May 26, 1885 |
| 323,220 | Shirley | July 28, 1885 |
| 346,883 | Armstrong | Aug. 10, 1886 |
| 531,816 | Wander | Jan. 1, 1895 |
| 771,377 | Ludloff | Oct. 4, 1904 |
| 804,736 | Kregel | Nov. 14, 1905 |
| 980,691 | Spierling | Jan. 3, 1911 |
| 1,174,056 | Danzenbaker | Mar. 7, 1916 |
| 1,947,706 | Frater | Feb. 20, 1934 |
| 1,950,321 | Neil | Mar. 6, 1934 |
| 2,201,100 | Rushing | May 14, 1940 |

OTHER REFERENCES

"Webster's New International Dictionary of the English Language," second edition, published in 1937. The definition of "mat" on page 1512.